US007635106B2

(12) United States Patent
Pham et al.

(10) Patent No.: US 7,635,106 B2
(45) Date of Patent: Dec. 22, 2009

(54) COMPOSITE SHEAR TIE (75) Inventors: Doan D. Pham, Tacoma, WA (US); Mark W. Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 11/564,964

(22) Filed: Nov. 30, 2006

(65) Prior Publication Data

US 2008/0128554 A1   Jun. 5, 2008

(51) Int. Cl.
B64C 3/26 (2006.01)
B64C 1/12 (2006.01)
(52) U.S. Cl. .................. 244/131; 244/132; 244/123.1
(58) Field of Classification Search ............ 244/117 R, 244/123.1, 123.8, 129.1, 131, 132, 123.4, 244/119; 52/702, 703, 289, 655.1, 483.1; 248/300, 220.21
See application file for complete search history.

(56) References Cited

U.S. PATENT DOCUMENTS

| 2,259,624 | A | * | 10/1941 | Dornier ...................... 244/119 |
| 2,392,788 | A | * | 1/1946 | Watter ..................... 244/117 R |
| 3,600,016 | A | * | 8/1971 | Dilley ......................... 403/389 |
| 3,920,206 | A | * | 11/1975 | Bigham et al. ............... 244/132 |
| 4,717,330 | A | | 1/1988 | Sarh |
| 5,806,797 | A | * | 9/1998 | Micale ........................ 244/120 |
| 5,842,668 | A | * | 12/1998 | Spencer ................... 244/118.1 |
| 6,386,481 | B1 | | 5/2002 | Kallinen |
| 6,502,788 | B2 | * | 1/2003 | Noda et al. ............... 244/123.3 |
| 6,739,099 | B2 | * | 5/2004 | Takeuchi et al. .............. 52/289 |
| 7,052,573 | B2 | | 5/2006 | Pham et al. |
| 2003/0178458 | A1 | * | 9/2003 | Trambley et al. ........... 224/326 |
| 2004/0195453 | A1 | * | 10/2004 | Gaitonde .................... 244/119 |

FOREIGN PATENT DOCUMENTS

| GB | 159663 | 3/1921 |
| GB | 520945 | 5/1940 |
| GB | 2312483 | 10/1997 |
| WO | WO03008265 A1 | 1/2003 |

* cited by examiner

Primary Examiner—Michael R Mansen
Assistant Examiner—Richard R Green
(74) Attorney, Agent, or Firm—Yee & Associates, P.C.; James M. Poole (57) ABSTRACT A composite shear tie for connecting a rib in a wing of an aircraft to a skin panel. The shear tie includes a web section having a first edge, a second edge, and a third edge. The web section is formed from a composite material. The first edge is parallel to the second edge, and the web section is configured to be connected to the rib in the wing of the aircraft. The shear tie also has a first free flange extending from the first edge, wherein the first free flange is around perpendicular to the web section and wherein the first free flange is formed from the composite material. A second free flange is present in the shear tie in which the second free flange extends from the second edge, wherein the second free flange is around perpendicular to the web section and wherein the second free flange is formed from the composite material. The shear tie has a base flange section extending from the third edge, wherein the first base flange is configured for attachment to the skin panel and wherein the first base flange is formed from the composite material.

16 Claims, 11 Drawing Sheets

COMPOSITE SHEAR TIE

BACKGROUND INFORMATION

1. Field of Invention

The present invention relates generally to aircraft and in particular to connecting components to each other in an aircraft. Still more particularly, the present invention relates to a shear tie for use in a wing rib.

2. Background Description

Composite materials are quickly replacing aluminum in aircraft. Composite materials provide weight savings and increased durability. In the design and manufacture of new aircraft, even the wing and fuselage are now being designed to use advanced composite materials. These materials include, for example, graphite combined with a toughened epoxy resin and titanium and graphite composites. An additional advantage of using composite materials is reducing electromagnetic effects (EMEs), such as those from lightning strikes.

Newer designs employ composite structural components in the wings, such as composite ribs and spars. Additionally, the skin panels used for the wing also are being designed using composite materials. An additional type of component that is heavy and subject to electro-magnetic effects is a shear tie used to connect a skin panel to a rib in the wing. Shear ties have a complex shape and specific load carrying requirements. Currently, metallic shear ties are preferred over composite shear ties due to these requirements. Creating shear ties using composite materials using the current shapes are unable to meet the load carrying requirements. Therefore, it would be advantageous to have an improved method and apparatus for connecting components to each other in a wing.

SUMMARY OF THE INVENTION

An embodiment of the present invention provides a composite shear tie for connecting a rib in a wing of an aircraft to a skin panel. The shear tie includes a web section having a first edge, a second edge, and a third edge. The web section is formed from a composite material. The first edge is parallel to the second edge, and the web section is configured to be connected to the rib in the wing of the aircraft. The shear tie also has a first free flange extending from the first edge, wherein the first free flange is around perpendicular to the web section and wherein the first free flange is formed from the composite material. A second free flange is present in the shear tie in which the second free flange extends from the second edge, wherein the second free flange is around perpendicular to the web section and wherein the second free flange is formed from the composite material. The shear tie has a base flange section extending from the third edge, wherein the first base flange is configured for attachment to the skin panel and wherein the first base flange is formed from the composite material.

In another embodiment, a composite shear tie has a planar section, a set of flanges, and a base section. The planar section is formed from a composite material and is configured for attachment to the rib in the wing of the aircraft. The set of flanges is around perpendicular to the planar section and is formed from the composite material. The base section extends from the planar section, wherein the base section is around perpendicular to the planar section and is configured for attachment to the skin panel.

In yet another embodiment, a method is used to fasten a rib in a wing of an aircraft to a skin panel for the aircraft. A planar section of a shear tie formed from a composite material is fastened to the rib in the wing of the aircraft. The shear tie includes a set of flanges extending from the planar section and a base section extending from the planar section, wherein the base section is around perpendicular to the planar section. The base section of the shear tie is fastened to the skin panel.

The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION OF THE INVENTION

Figure 1:
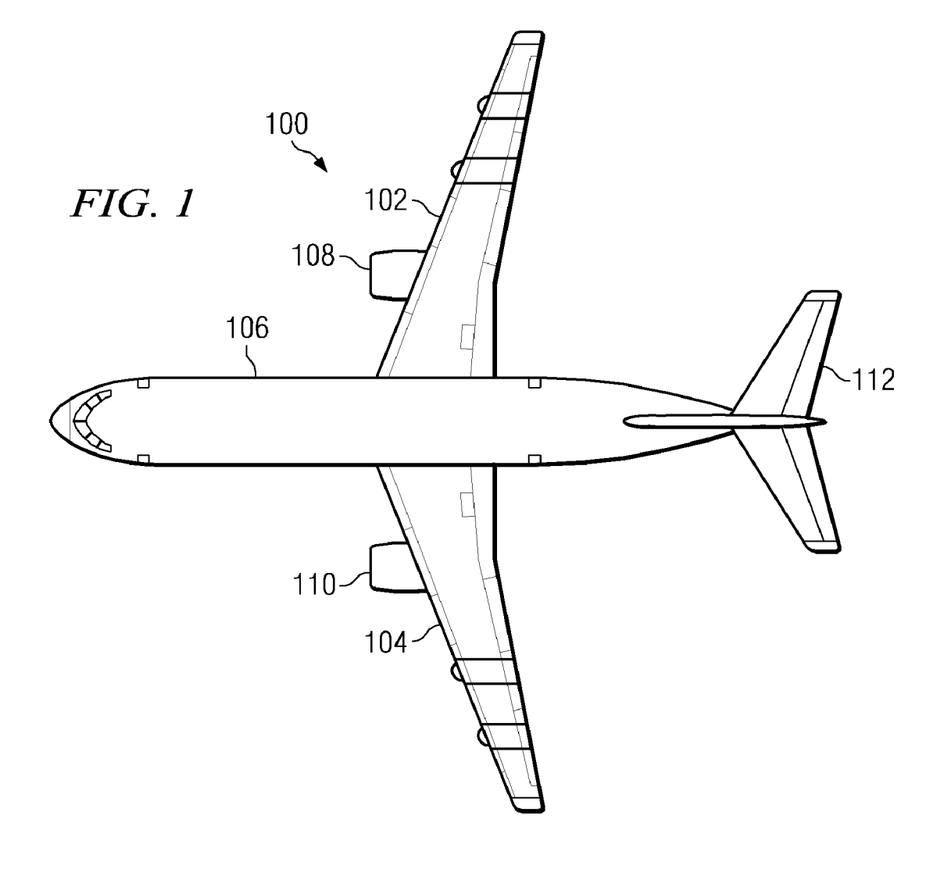
FIG. 1 is an example of an aircraft in which the advantageous embodiments of the present invention may be implemented.

With reference now to the figures, FIG. 1 is an example of an aircraft in which the advantageous embodiments of the present invention may be implemented. Aircraft 100 is an example of an aircraft in which a method and apparatus for tying a rib to a skin to a wing may be implemented. In this illustrative example, aircraft 100 has wings 102 and 104 attached to body 106. Aircraft 100 includes wing mounted engine 108, wing mounted engine 110, and tail 112. The different advantageous embodiments include composite shear ties used to connect ribs within wings 102 and 104 to skin panels for the wings.

Figures 2, 3:
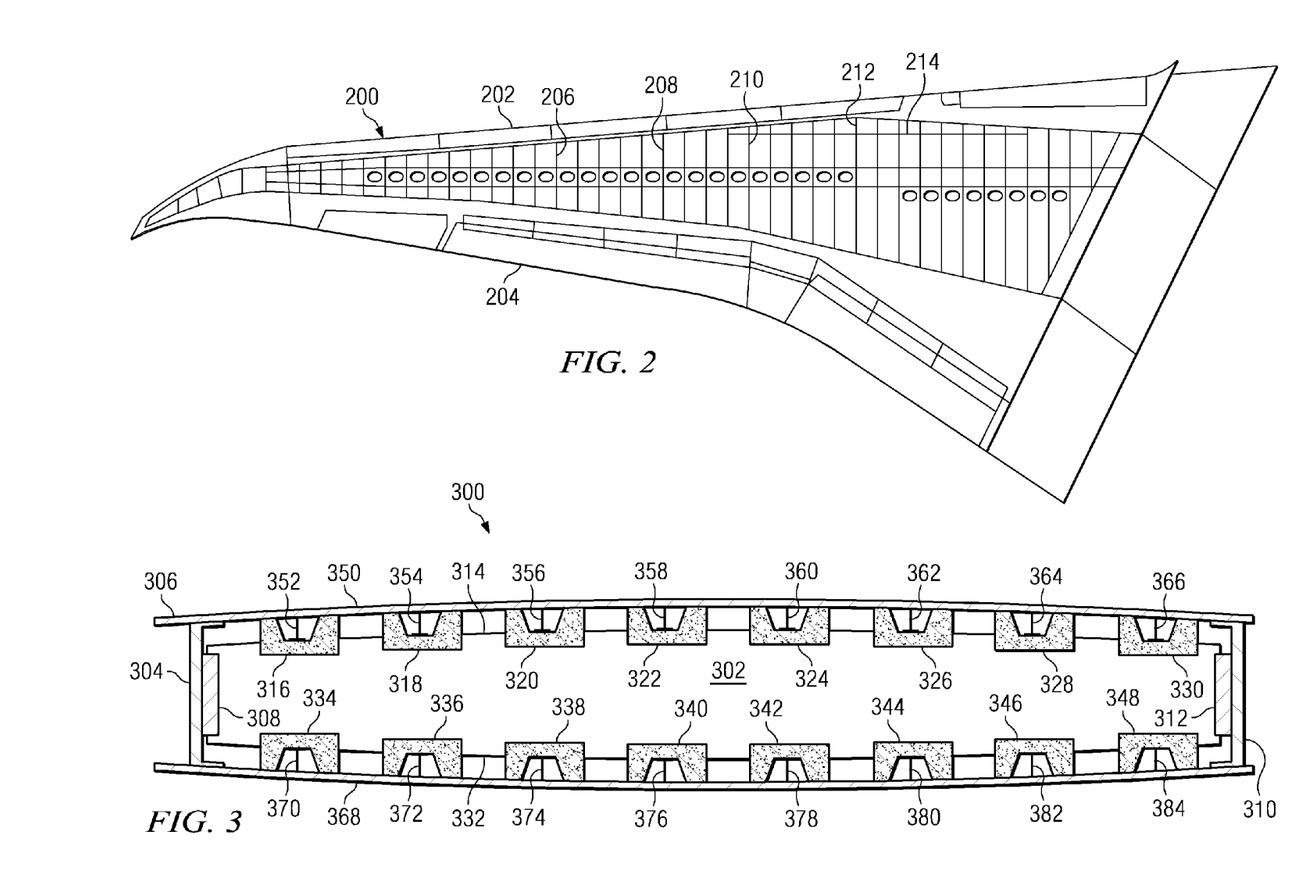
FIG. 2 is a diagram illustrating a top view of a wing in accordance with an advantageous embodiment of the present invention.
FIG. 3 is a cross-sectional diagram of a wing in accordance with an advantageous embodiment of the present invention.

Turning now to FIG. 2, a diagram illustrating a top view of a wing is depicted in accordance with an advantageous embodiment of the present invention. In this particular example, wing 200 is a more detailed example of wing 104 in FIG. 1. In this particular example, wing 200 has a front edge 202 and a rear edge 204. Ribs 206, 208, 210, and 214 are examples of ribs in which composite shear ties may be used to connect the ribs to skin panels for wing 200 in accordance with an advantageous embodiment of the present invention. A skin panel is a component over which air flows when the aircraft is flying. The other ribs illustrated in wing 200 also may use composite shear ties, but are unlabeled to simplify the illustration.

The advantageous embodiments of the present invention provide a composite shear tie for connecting a rib to a skin panel for an aircraft. The composite shear tie has a planar section, wherein the planar section is formed from a composite material and is configured for attachment to the rib in the wing of the aircraft. The composite shear tie also has a set of flanges extending from the planar section, wherein the set of flanges is around perpendicular to the planar section, formed from the composite material, and strengthens the planar section against loads from the rib and the skin panel. The composite shear tie also includes a base section extending from the planar section, wherein the base section is around perpendicular to the planar section and is configured for attachment to the skin panel.

With reference next to FIG. 3, a cross-sectional diagram of a wing is depicted in accordance with an advantageous embodiment of the present invention. In this particular example, wing 300 is a cross-sectional view of a wing, such as wing 200 in FIG. 2. Wing 300 includes rib 302. Rib 302 is connected to front spar 304 on front side 306 of wing 300. Rib 302 is connected to front spar 304 through rib post 308. Rib 302 also is connected to rear spar 310 through rib post 312.

In these examples, upper side 314 of rib 302 has composite shear ties 316, 318, 320, 322, 324, 326, 328, and 330 attached to rib 302. Bottom side 332 of rib 302 has composite shear ties 334, 336, 338, 340, 342, 344, 346 and 348 attached. Upper skin panel 350 is attached to composite shear ties 316, 318, 320, 322, 324, 326, 328, and 330 through stringers 352, 354, 356, 358, 360, 362, 364, and 366. In these examples, these shear ties are composite shear ties. Lower skin panel 368 is attached to composite shear ties 334, 336, 338, 340, 342, 344, 346, and 348 using stringers 370, 372, 374, 376, 378, 380, 382 and 384. An illustrative advantage of using composite shear ties is a decrease in the weight of a wing.

Figure 4:
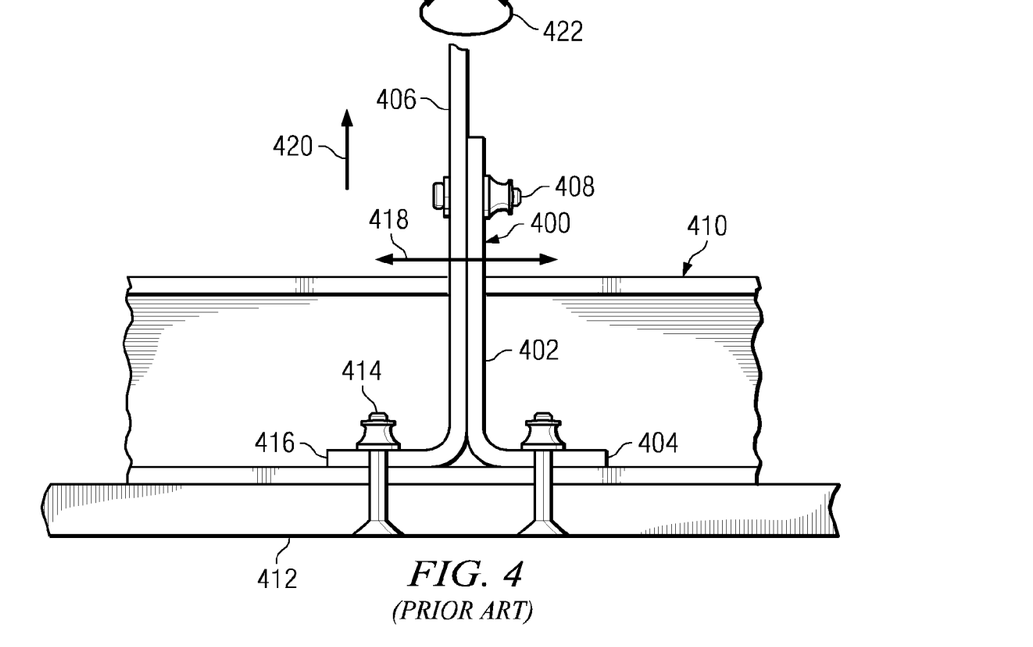
FIG. 4 is a diagram illustrating a side view of a known shear tie.

Turning now to FIG. 4, a diagram illustrating a side view of a known shear tie is depicted. In this example, shear tie 400 has a flat section 402 and a base section 404. Flat section 402 is connected to rib 406 through fastener 408. Base section 404 connects shear tie 400 to stringer 410 and skin 412. Additionally in this example, rib 406 also is connected to stringer 410 and skin 412 through fastener 414. As can be seen in this example, rib 406 has a portion that curves to form base portion 416 through which fastener 414 extends.

In this depicted example, shear tie 400 does not include any members, flanges, or structures that extend from the flat section, as found in the composite shear ties in the illustrative embodiments. Shear tie 400 has a single simple L-angle formed by flat section 402 and base section 404.

The different embodiments of the present invention recognize that additional structural stiffening against forces along the direction of arrow 418 are currently unneeded because of the material in metal shear ties configured like shear tie 400. With composite shear ties, the advantageous embodiments of the present invention recognize that a composite shear tie using the design of a shear tie 400 does not provide the necessary structural stability against forces along the direction of arrow 418. Further, this type of design is inadequate with "pull off" that a wing may place on a shear tie as shown by arrow 420, as well as bending or twisting that may occur as shown by arrow 422. Shear tie 400 is two-dimensional with respect to forces along the directions of arrows 418, 420, and 422. This type of design is inefficient at reacting to a side load when composite materials are used. As a result, bending occurs.

Figure 5:
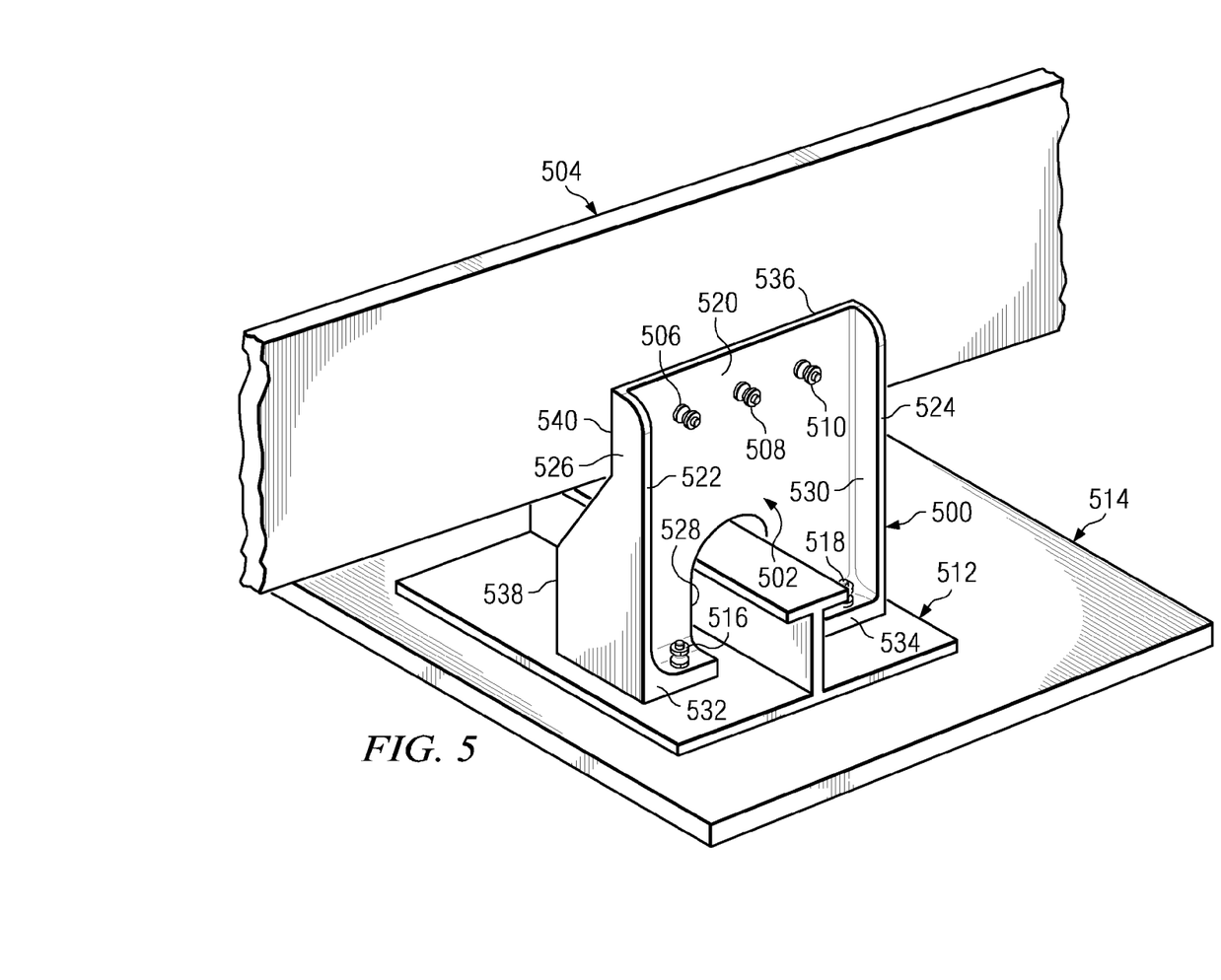
FIG. 5 is a diagram illustrating a portion of an internal wing structure in accordance with an advantageous embodiment of the present invention.

With reference now to FIG. 5, a diagram illustrating a portion of an internal wing structure is depicted in accordance with an advantageous embodiment of the present invention. In this particular example, composite shear tie 500 is an example of a shear tie using composite materials that may be used with a rib, such as rib 504. This internal structure illustrated in FIG. 5 is a perspective view of an assembly, such as that shown for wing 300 in FIG. 3.

Composite shear tie 500 includes planar section 502, which is connected to rib 504 using fasteners 506, 508, and 510. Planar section 502 also is referred to as a web or web section. Stringer 512 is located between composite shear tie 500 and skin panel 514. Fasteners 516 and 518 are used to attach shear tie 500 to skin 514.

Fasteners 506, 508, 510, 516, and 518 are shown on side 520 of composite shear tie 500. Composite shear tie 500 also has free flanges 522 and 524, which extend from side 520. Free flange 522 extends from side 520 along edge 526 and edge 528. Side 520 is part of planar section 502 of shear tie 500. Free flange 524 extends from side 520 along edge 530 and another edge similar to edge 528, but hidden by stringer 512 in this view. Free flange 522 and free flange 524 extend from side 520 in a manner that is normal or around normal to side 520. In other words, free flange 522 and free flange 524 have an angle of around ninety degrees relative to a plane through side 520.

A portion of free flange 522 forms base section 532 through which fastener 516 connects composite shear tie 500 to stringer 512 and skin panel 514. In a similar fashion, free flange 524 includes base section 534 through which fastener 518 is used to connect composite shear tie 500 to stringer 512 and skin panel 514.

Composite shear tie 500 also has side 536 of planar section 502, which is opposite the side 520 of planar section 502. Free flange 538 extends from side 536 along edge 540 in a manner such that free flange 538 is substantially perpendicular to side 536. Free flange 538 is along a same plane as free flange 522 in these examples.

In this depicted example, free flange 522 forms a "tub" or "bath tub" type fitting. Free flange 524 and free flange 538 also provide a similar type shape. In these illustrative examples, the addition of these free flanges and the base sections to shear tie 500 provide additional structural stability against the flexing of shear tie 500 when attached to rib 504 and skin panel 514. As shown in FIG. 5, the web section 520 and the base sections 532 and 534 have a groove extending therethrough between the edges 526 and 528 which is configured to allow stringer 512 to pass through the groove. As also shown in FIG. 5, portions of stringer 512 are positioned between the base sections of the composite shear tie 500 and the skin panel 514 such that fasteners 516 and 518 attach the composite shear tie to both stringer 512 and to skin panel 514.

Figure 6:
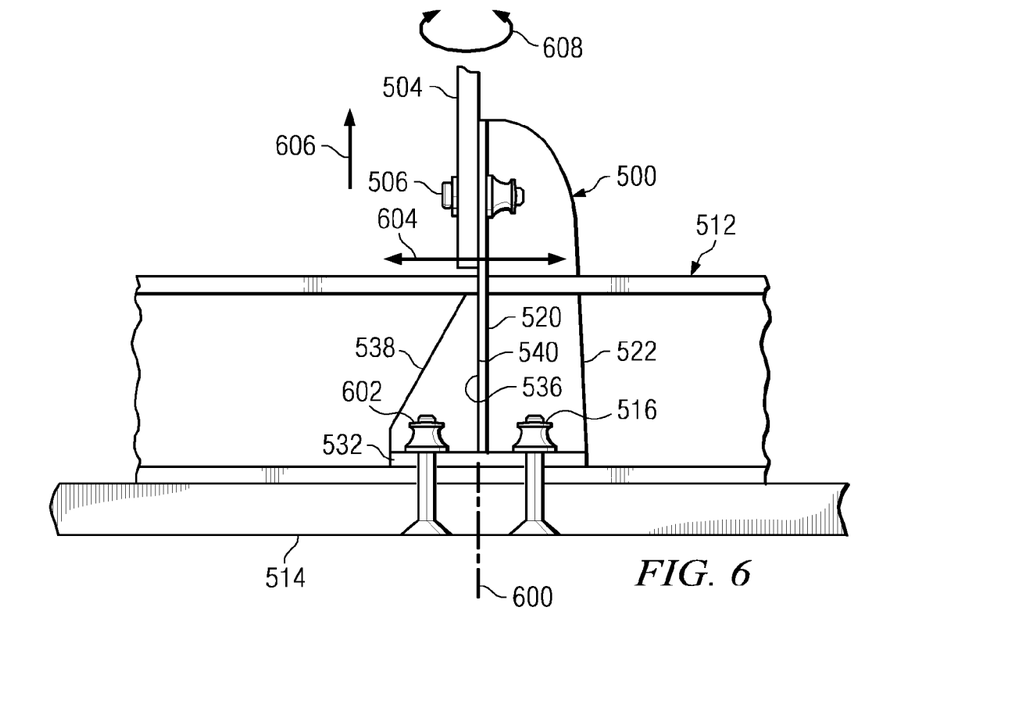
FIG. 6 is a diagram of a shear tie in accordance with an advantageous embodiment of the present invention.

Turning next to FIG. 6, a diagram of a shear tie is depicted in accordance with an advantageous embodiment of the present invention. In this example, shear tie 500 in FIG. 5 is shown from a side view.

This side view of shear tie 500 provides another perspective of one of the free flanges, free flange 522. As can be seen in this illustration, free flange 522 extends perpendicular to a plane along rib web 520 of shear tie 500. As can be seen, base 532 of free flange 522 allows for fastening of shear tie 500 to skin panel 514 using fastener 516. Free flange 522 is an example of a structural feature in shear tie 500 that provides for increased structural stability of shear tie 500 with respect to different forces encountered when shear tie 500 is attached to rib 504 and skin panel 514.

Free flange 538 is an example of another feature in an advantageous embodiment of the present invention that provides for additional stability. Free flange 538 is similar to free flange 522. In this example, a portion of free flange 538 forms base section 600 through which fastener 602 is used to connect or fasten composite shear tie 500 to stringer 512 and skin panel 514.

In these illustrative examples, the protruding structures or members, such as the free flanges and the base sections provide an additional structural feature not found in currently used shear ties made of metal. These additional features provide for a structural stability against forces occurring along a plane perpendicular to rib web 520. In particular, structural elements in shear tie 500, such as free flanges 522 and 538 provide for increased structural stability against the bending of rib web 520 with respect to forces exerted along the direction of arrow 604.

This design also provides increased structural integrity to resist "pull off" forces in the direction of arrow 606 and to twisting or bending forces in the directions of arrow 608. In this manner, the different flanges and the base provide increased resistance to loading on shear tie 500.

With reference to FIGS. 7A-12, diagrams illustrating components at steps used to create a composite shear tie are depicted in accordance with an advantageous embodiment of the present invention. These diagrams illustrate the process to create a shear tie, such as shear tie 500 in FIG. 5.

Figure 7A:
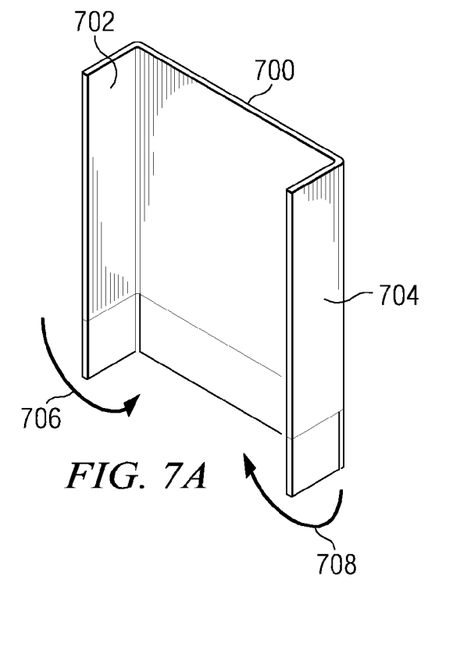
FIGS. 7A-7C are diagrams illustrating a lay up sequence used to form a portion of a shear tie in accordance with an advantageous embodiment of the present invention.
Figure 7B:
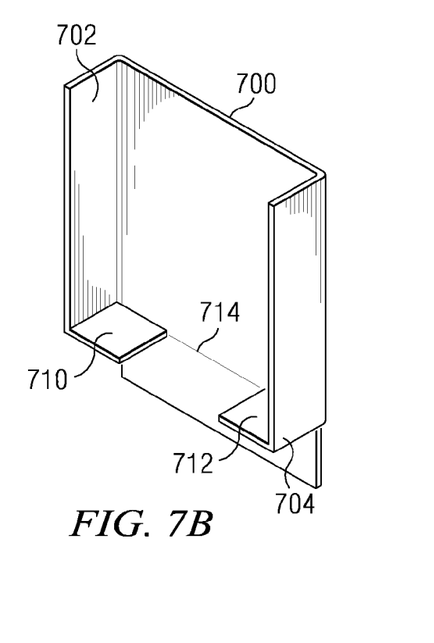
Figure 7C:
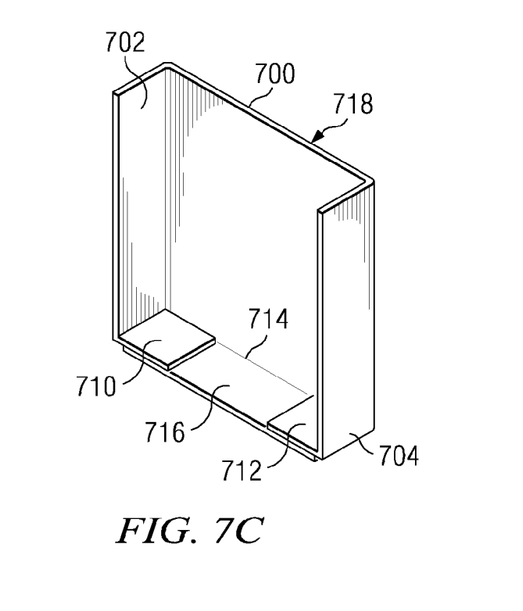

Turning now to FIGS. 7A-7C, diagrams illustrating a lay up sequence used to form a portion of a shear tie is depicted in accordance with an advantageous embodiment of the present invention. All of the materials used in the components that form the shear ties are composite materials. A composite material is two or more constituent materials with different physical or chemical properties. In these examples, the composite materials are formed from materials that reduce electromagnetic effects.

These materials may include, for example, graphite combined with a toughened epoxy resin and titanium and graphite composites. In these particular examples, the composite material is formed from carbon fiber impregnated with resin. These materials are in the form of tape and fabric that are layered over each other to form a shear tie. Other forms of material, such as dry fiber, either continuous or discontinuous, are enclosed in a mold. Resin is then injected or introduced into the mold by resin transfer molding or by resin injection molding. The actual composite materials used will depend on the particular implementation. These examples of composite materials are presented only for purposes of illustration and are not meant limit the type of composite material that may be used for form composite shear ties. Different requirements, such as loading or cost may affect the particular composite material used.

In this illustrative example, in FIG. 7A sheet 700 is an example of a composite material in which section 702 and section 704 are folded over in the directions of arrows 706 and 708. Sides 702 and 704 are perpendicular to the unfolded portion of sheet 700. Next in FIG. 7B, sections 710 and 712 are folded towards line 714 of sheet 700. Thereafter, in FIG. 7C, section 716 of sheet 700 is folded in the same direction onto section 710 and 712 to lock the pieces in place. This final configuration of sheet 700 forms tub fitting 718. Section 702 and the folded portion section 710 are similar to free flange 522 along with base 532 depicted in FIG. 5. Section 704 together with folded section 712 also form a "free flange".

Depending on the implementation, section 716 may be folded upward along the line 714 prior to folding sections 710 and 712 to line up along line 714 depending upon the particular implementation.

Figure 8A:
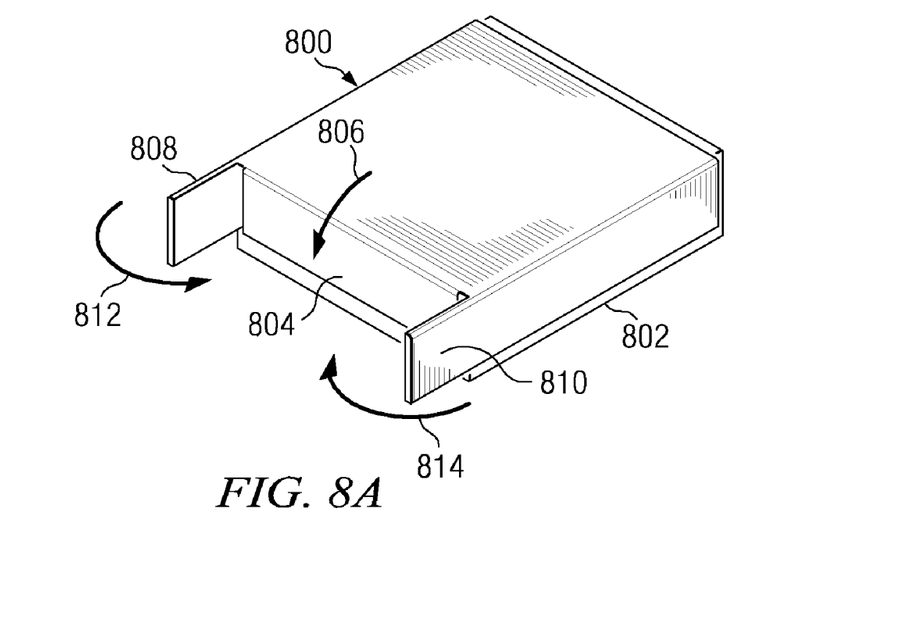
FIGS. 8A and 8B are illustrations of tub fittings on lay up mandrels in accordance with an advantageous embodiment of the present invention.

Turning next to FIGS. 8A and 8B, illustrations of tub fittings on lay up mandrels is depicted in accordance with an advantageous embodiment of the present invention. In this example, tub fitting 800 is an example of tub fitting 718 in FIG. 7. In this example, tub fitting 800 is laid up or folded on lay up mandrel 802. Lay up mandrel 802 is a tool where parts may be laid on to the tool to provide a shape for the final configuration. In this particular example, section 804 is folded along the direction of arrow 806. Thereafter, sections 808 and 810 are folded onto section 804 along the directions of arrows 812 and 814 respectively.

Figure 8B:
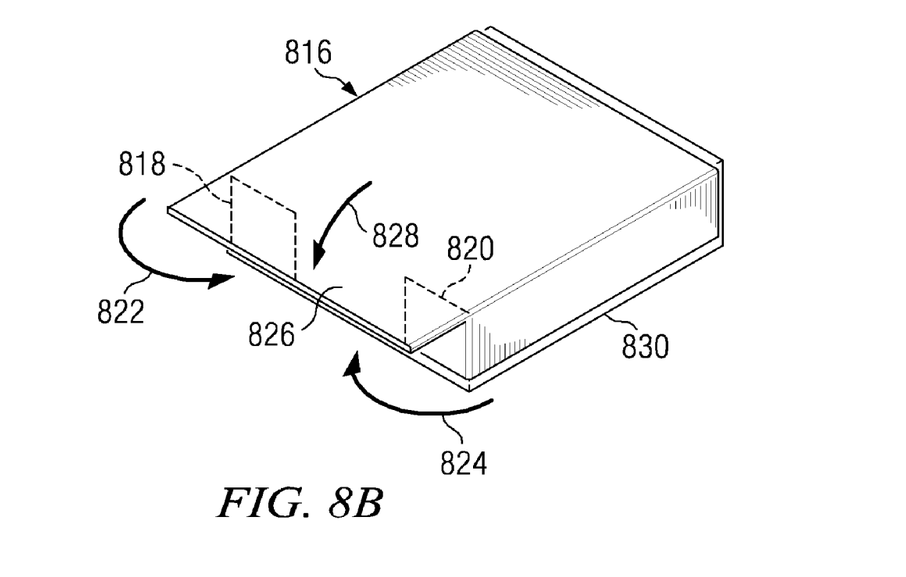

In FIG. 8B, tub fitting 816 is formed with sections 818 and 820 being folded along the direction of arrows 822 and 824. Tub fitting 816 is another example of a tub fitting, such as tub fitting 718 in FIG. 7. Section 826 is folded along the direction of arrow 828 after these two sections. The folding is in a different order as compared to tub fitting 800. As with tub fitting 800, these folds are made on a tool, such as lay up mandrel 830.

Figure 9:
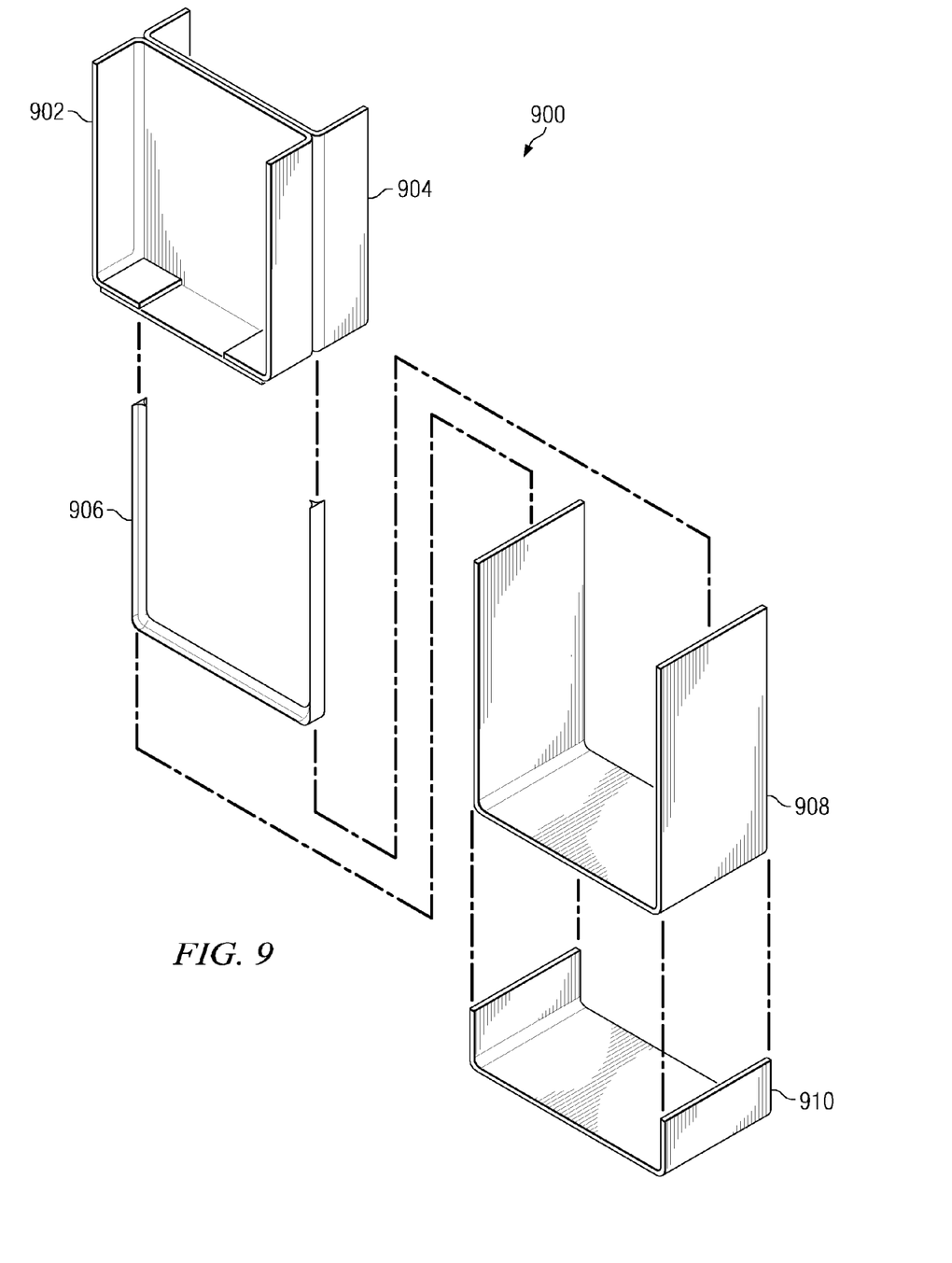
FIG. 9 is a diagram illustrating components used in forming a shear tie in accordance with an advantageous embodiment of the present invention.

Turning next to FIG. 9, a diagram illustrating components used in forming a shear tie is depicted in accordance with an advantageous embodiment of the present invention. FIG. 9 provides an exploded view of components for shear tie 900. These components are all formed using composite materials in these examples. This illustrative example is one configuration for a shear tie using composite materials. Tub fitting 902 and tub fitting 904 are placed together back-to-back. Tub fittings 800 and 816 in FIG. 8 are examples of tub fittings that may be used for tub fitting 902 and tub fitting 904. Radius filler 906 is used to fill the radii between tub fitting 902 and tub fitting 904.

Full plies 908 may be applied to tub fitting 902 and tub fitting 904 after radius filler 906 has been used to fill the radii between these two components. A full ply is a ply that may encompass the entirety of three edges of a tub fitting in these examples. After full ply 908 has been placed, filler ply 910 may be used to meet thickness requirements. Filler plies, like filler ply 910 cover the edge of a base section.

Multiple plies like ply 908 and filler ply 910 may be used depending on the thickness requirements. The materials used for these plies and the radius filler are composite materials. The materials may be the same as used to create tub fittings 902 and 904 or may be different types of composite materials depending on the particular implementation. A use of heterogeneous types of composite materials to form a shear tie may be employed to provide for increased structural stiffness.

Figures 10, 11:
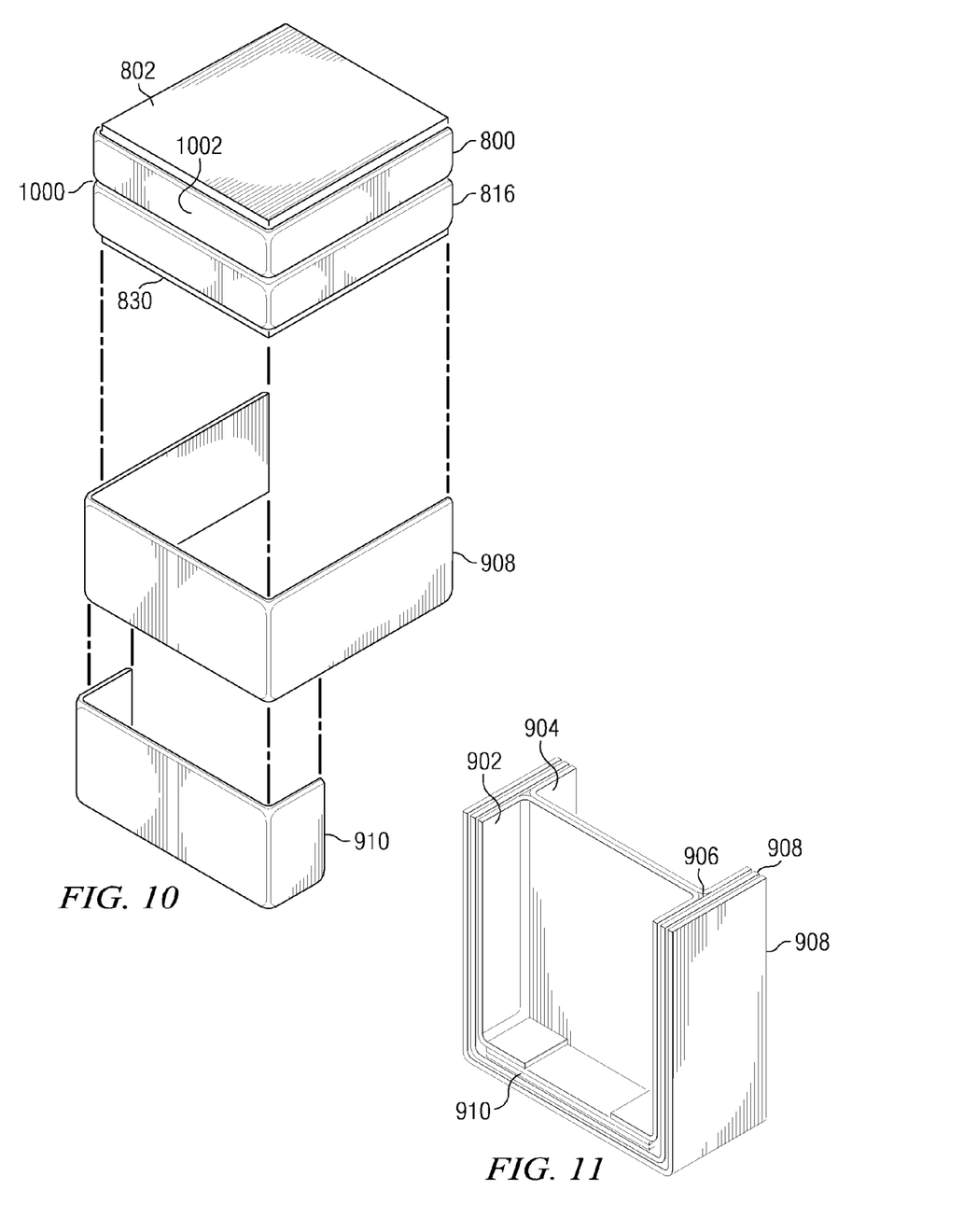
FIG. 10 is a diagram illustrating additional steps in the lay up sequence for creating a shear tie in accordance with an advantageous embodiment of the present invention.
FIG. 11 is a diagram illustrating the assembled components from FIG. 9 in accordance with an advantageous embodiment of the present invention.

Turning now to FIG. 10, a diagram illustrating additional steps in the lay up sequence for creating a shear tie is depicted in accordance with an advantageous embodiment of the present invention. Tub fitting 800 is placed back-to-back with tub fitting 816 by placing lay up mandrel 802 on to lay up mandrel 830. At this point, radius filler may be placed into radii 1000. Thereafter, full ply 908 and filler ply 910 may be placed onto tub fitting 800 and tub fitting 816 along side 1002.

Turning now to FIG. 11, a diagram illustrating the assembled components from FIG. 9 is depicted in accordance with an advantageous embodiment of the present invention. In this example, multiple plies, such as full ply 908 are used. Only filler ply 910 is required in this example. Of course, additional partial plies may be used depending upon the particular implementation.

Figure 12:
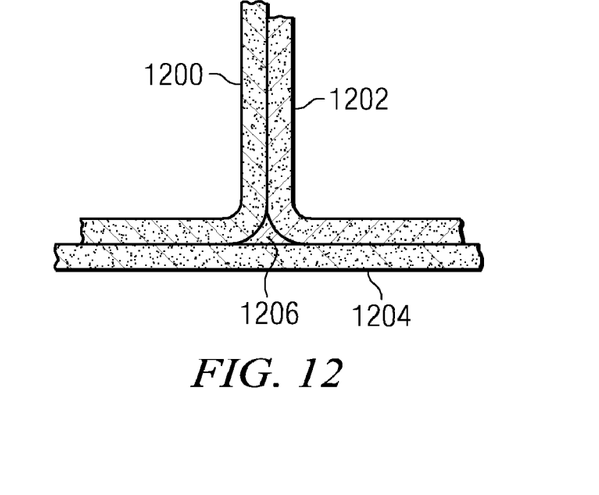
FIG. 12 is a cross-sectional view of a shear tie in accordance with an advantageous embodiment of the present invention.

Turning now to FIG. 12, a cross-sectional view of a shear tie is depicted in accordance with an advantageous embodiment of the present invention. In this particular example, a cross-sectional view of tub fitting 1200 and tub fitting 1202 are illustrated. In this cross-sectional view, ply 1204 is a wrap ply, such as full ply 908 or filler ply 910 in FIG. 9, used to increase thickness and tie together tub fitting 1200 and tub fitting 1202. In this view, radius filler 1206 also may be seen as filling the gap or radii present between the components.

When the different components are laid up or folded onto the lay up mandrels, the final form of the shear tie may be heated to cure the composite materials. The heating hardens these materials such that they will retain their shape when these tools are removed.

Figure 13:
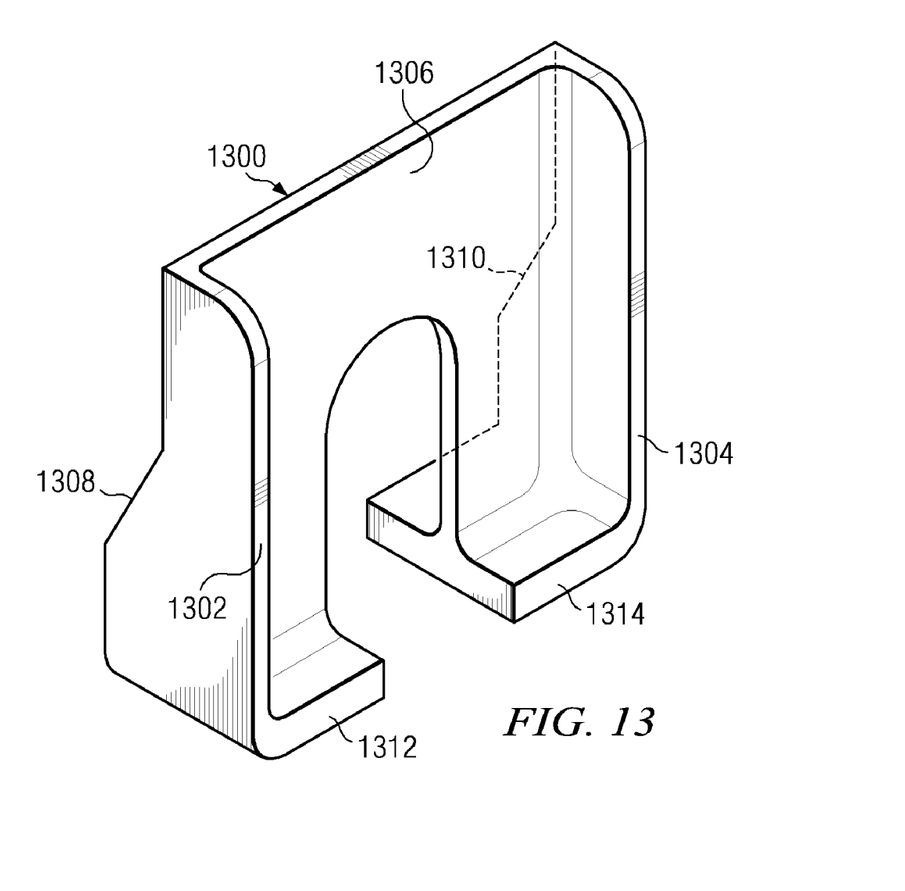
FIG. 13 is a diagram illustrating a perspective view of a finished shear tie in accordance with an advantageous embodiment of the present invention.

Turning now to FIG. 13, a diagram illustrating a perspective view of a finished shear tie is depicted in accordance with an advantageous embodiment of the present invention. In this example, shear tie 1300 is an example of a finished composite material shear tie that may be used to tie a rib in a wing to a skin for the wing. Shear tie 1300 is a diagram illustrating a completed shear tie created using the steps and components illustrated in FIGS. 7A-12.

Portions of this shear tie may have been trimmed to form the appropriate final shapes needed as illustrated by composite shear tie 1300. As can be seen in this example, free flanges 1302 and 1304 provide additional structural stability against forces that may bend shear tie 1300 along a plane extending planar section 1306. As depicted, shear tie 1300 also includes free flanges 1308 and 1310. Free flanges 1302 and 1304 are formed from one tub fitting, while free flanges 1308 and 1310 originate from another tub fitting placed back-to-back in these examples. Base sections 1312 and 1314 are additional features that increase structural integrity in these examples.

Planar section 1306 has a thickness of around 0.16 inches in this example. Free flanges 1302, 1304, 1308, and 1310 have a thickness of around 0.120 inches. Base sections 1312 and 1314 have a thickness of around 0.43 inches. These dimensions are provided only as one illustrative example of dimensions that may be used to form a composite shear tie. The dimensions used may vary depending on the type of composite material used and other factors, such as loading requirements.

Of course, other shapes and forms may be used to create shear ties using composite materials. In the depicted examples, a set of one or more protruding edges or tub type fittings are present in the different illustrative embodiments.

Figure 14:
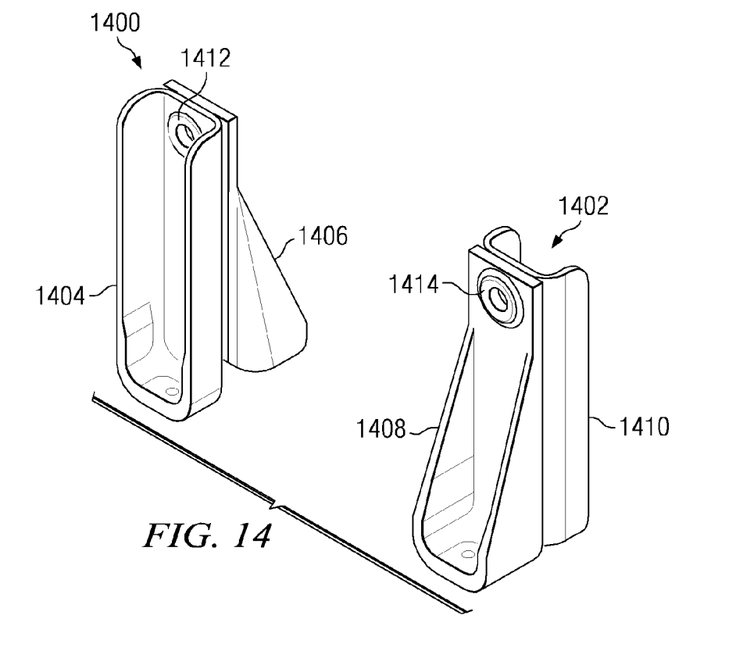
FIG. 14 is a diagram illustrating another configuration for a composite shear tie in accordance with an advantageous embodiment of the present invention.

Turning now to FIG. 14, a diagram illustrating another configuration for a composite shear tie is depicted in accordance with an advantageous embodiment of the present invention. In these examples, shear ties 1400 and shear ties 1402 each contain two bath tub type fittings that are placed back-to-back. Shear tie 1400 contains tub fitting 1404 and tub fitting 1406, which had been attached to each other. Shear tie 1402 contains tub fitting 1408 and tub fitting 1410, which have been connected to each other. In these examples, these tub fittings are connected to each other through fasteners 1412 and 1414. These fasteners are used when shear tie 1400 or shear tie 1402 is attached to a rib.

Figure 15:
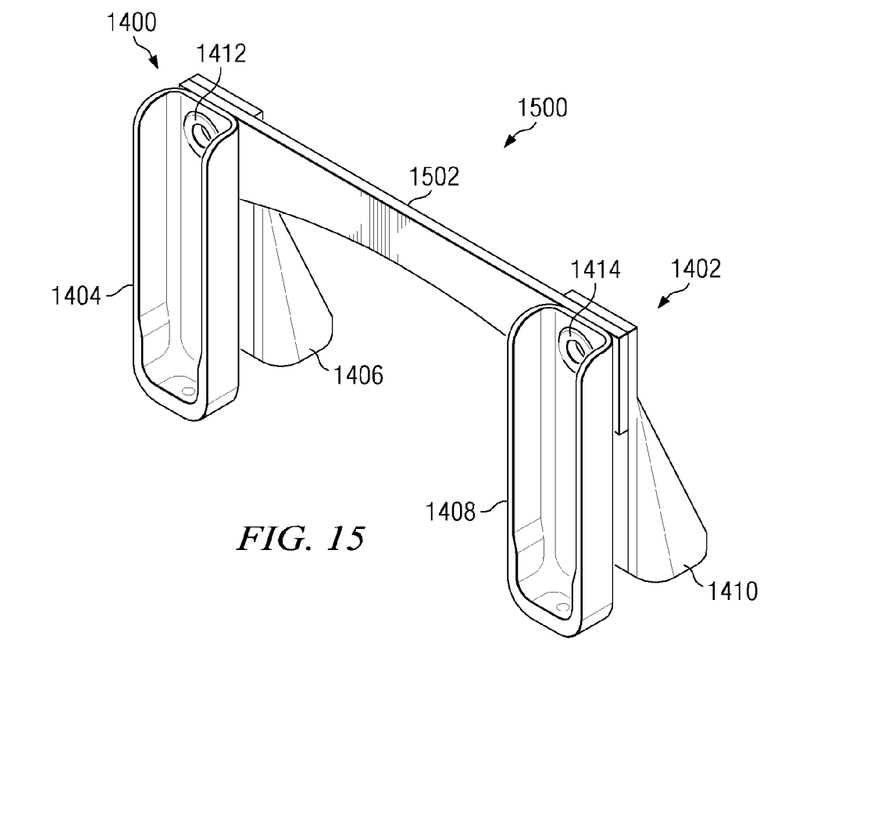
FIG. 15 is another configuration for a shear tie in accordance with an advantageous embodiment of the present invention.

Turning next to FIG. 15, another configuration for a shear tie is depicted in accordance with an advantageous embodiment of the present invention. In this example, shear tie 1500 is formed from shear ties 1400 and 1402 connected with section 1502. These examples illustrate the different components being connected using fasteners. Of course, the components could be connected using other mechanisms, such as an adhesive or glue.

Figure 16A:
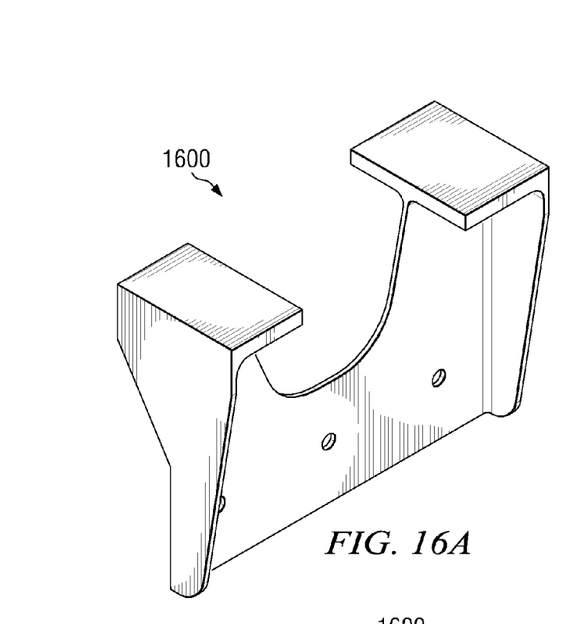
FIGS. 16A-16E are diagrams illustrating dimensions for a composite shear tie in accordance with an advantageous embodiment of the present invention.
Figure 16B:
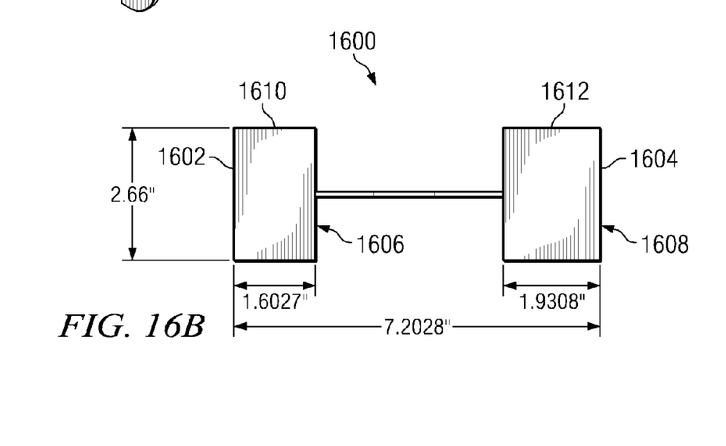
Figure 16C:
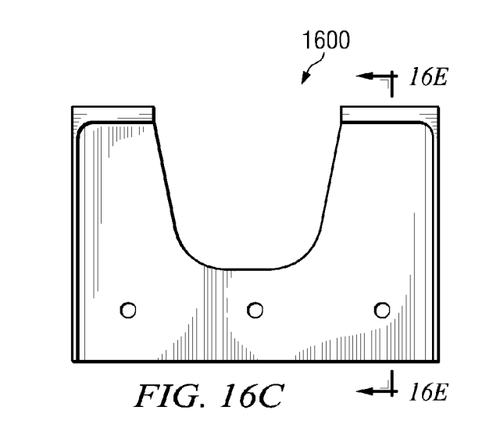
Figures 16D, 16E:
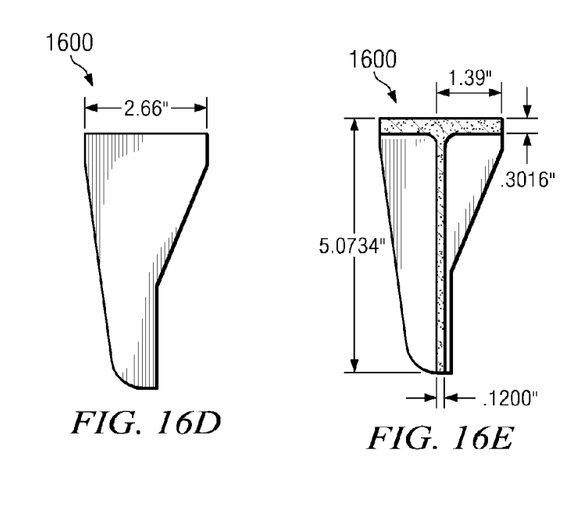

Turning now to FIGS. 16A-16E, diagrams illustrating dimensions for a composite shear tie are depicted in accordance with an advantageous embodiment of the present invention. Composite shear tie 1600 depicted in FIG. 16A is an example of one configuration for a composite shear tie in accordance with an advantageous embodiment of the present invention. FIG. 16B illustrates a top view of composite shear tie 1600. The width of composite shear tie 1600 from side 1602 to side 1604 is around 7.2028 inches in this example. In this example, base 1606 has a width of 1.6027 inches along side 1610, while base 1608 has a width of 1.9308 inches along side 1612. Both base 1606 and base 1608 have a depth of 2.66 inches in these examples. FIG. 16C illustrates a front view of composite shear tie 1600, while FIG. 16D illustrates a right view of composite shear tie 1600. FIG. 16E illustrates a cross-sectional view of composite shear tie 1600 along lines E-E from FIG. 16C.

Thus, the different advantageous embodiments of the present invention provide an improved apparatus and method for connecting components together in an aircraft wing. A rib in a wing of the aircraft is connected to a skin panel for the wing using a composite shear tie. The composite shear tie has a planar section, wherein the planar section is formed from a composite material and is configured for attachment to the rib in the wing of the aircraft. The composite shear tie also has a set of flanges extending from the planar section, wherein the set of flanges is around perpendicular to the planar section, formed from the composite material, and strengthens the planar section against loads from the rib and the skin panel. The composite shear tie also includes a base section extending from the planar section, wherein the base section is around perpendicular to the planar section and is configured for attachment to the skin panel.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A composite shear tie for connecting a rib in a wing of an aircraft to a skin panel, the composite shear tie comprising:
    a planar web section formed from a composite material and having first and second opposed sides, a first edge, a second edge opposed to the first edge, and a third edge, wherein the first edge is around parallel to the second edge and wherein the planar web section is configured for attachment to the rib in the wing of the aircraft;

a first free flange formed from the composite material and extending from the first edge, wherein the first free flange is around perpendicular to the first and second opposed sides of the planar web section and extends in first and second opposed directions from the first and second opposed sides, respectively, of the planar web section;

a second free flange formed from the composite material and extending from the second edge, wherein the second free flange is around perpendicular to the first and second opposed sides of the planar web section and extends in the first and second opposed directions from the first and second opposed sides, respectively, of the planar web section;

a base section formed from the composite material and extending from the third edge, wherein the base section is configured for attachment to the skin panel; and a groove extending through the planar web section between the first and second opposed edges of the planar web section and through the base section and configured for allowing a stringer to pass through the groove.

2. The composite shear tie of claim 1, wherein the base section extends in the first and second opposed directions from the first and second opposed sides, respectively, of the planar web section.

3. The composite shear tie of claim 1, wherein the planar web section is attached to the rib using a set of web section fasteners extended through the planar web section.

4. The composite shear tie of claim 1, wherein the base section is attached to the skin panel using a set of base section fasteners extended through the base section.

5. The composite shear tie of claim 4, wherein the stringer comprises portions configured to be positioned between the base section and the skin panel, and wherein the set of base section fasteners attach the composite shear tie to both the portions of the stringer and the skin panel.

6. The composite shear tie of claim 1, wherein the composite material is comprised of an epoxy resin and an intermediate modulus fiber.

7. A composite shear tie comprising:
a planar section, wherein the planar section is formed from a composite material and is configured for attachment to a rib in a wing of an aircraft;

a set of flanges extending from the planar section, wherein each flange of the set of flanges is around perpendicular to first and second opposed sides of the planar section, extends in first and second opposed directions from the first and second opposed sides, respectively, of the planar section, and is formed from the composite material;

a base section extending from the planar section, wherein the base section is around perpendicular to the planar section, extends in the first and second opposed directions from the first and second opposed sides, respectively, of the planar section, is formed from the composite material, and is configured for attachment to a skin panel of the aircraft; and a groove extending through the planar section between first and second opposed edges of the planar section and through the base section and configured for allowing a stringer to pass through the groove.

8. The composite shear tie of claim 7, wherein the planar section is configured for attachment to the rib using a set of planar section fasteners extended through the planar section.

9. The composite shear tie of claim 7, wherein the base section is configured for attachment to the skin panel using a set of base section fasteners extended through the base section.

10. The composite shear tie of claim 9, wherein the stringer comprises portions configured to be positioned between the base section and the skin panel, and wherein the set of base section fasteners attach the composite shear tie to both the portions of the stringer and the skin panel.

11. The composite shear tie of claim 7, wherein the composite material is comprised of an epoxy resin and an intermediate modulus fiber.

12. The composite shear tie of claim 7, wherein the set of flanges strengthen the planar section against loads applied by the rib and the skin panel.

13. A method comprising:
providing a shear tie comprising a planar section, a set of flanges extending from the planar section, wherein each flange of the set of flanges is around perpendicular to the planar section and extends in first and second opposed directions from first and second opposed sides, respectively, of the planar section, and a base section extending from the planar section, wherein the base section is around perpendicular to the planar section, wherein the planar section, the set of flanges and the base section are formed of a composite material;

providing a groove in the shear tie that extends through the planar section between first and second opposed edges of the planar section and through the base section, wherein the groove is configured for allowing a stringer to pass through the groove;

fastening the planar section of the shear tie to a rib in a wing of an aircraft; and fastening the base section of the shear tie to a skin panel of the aircraft.

14. The method of claim 13, further comprising:
placing portions of the stringer between the base section of the shear tie and the skin panel, wherein fastening the base section of the shear tie to a skin panel of the aircraft comprises fastening the base section of the shear tie to both the portions of the stringer and the skin panel.

15. The method of claim 13, wherein the composite material is comprised of an epoxy resin and an intermediate modulus fiber.

16. The method of claim 13, wherein fastening the planar section of the shear tie to a rib in a wing of an aircraft comprises fastening the planar section of the shear tie to the rib with a set of planar section fasteners extended through the planar section, and wherein fastening the base section of the shear tie to a skin panel of the aircraft comprises fastening the base section of the shear tie to the skin panel with a set of base section fasteners extended through the base section.

* * * * *